US012792745B1

(12) United States Patent
Bishop et al.

(10) Patent No.: US 12,792,745 B1
(45) Date of Patent: Nov. 10, 2026

(54) SYSTEM AND METHOD FOR DYNAMICALLY UPDATING THREAT MODELS BASED ON APPLICATION SECURITY TESTING

(71) Applicant: Bank of America Corporation, Charlotte, NC (US)

(72) Inventors: Jack Bishop, Evanston, IL (US); Jason C. Starin, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/214,141

(22) Filed: May 21, 2025

(51) Int. Cl.
*G06F 21/57* (2013.01)
*G06F 21/62* (2013.01)

(52) U.S. Cl.
CPC ........ *G06F 21/577* (2013.01); *G06F 21/6218* (2013.01)

(58) Field of Classification Search
CPC ............. H04L 63/1433; H04L 63/1416; H04L 63/1441; H04L 63/14; G06F 21/563; G06F 21/577; G06F 21/562; G06F 21/57; G06F 11/3608; G06F 11/3604; G06F 11/008; G06F 2221/033
See application file for complete search history.

(56) References Cited

U.S. PATENT DOCUMENTS

| | | | |
|---|---|---|---|
| 7,891,003 | B2 | 2/2011 | Mir et al. |
| 8,312,549 | B2 | 11/2012 | Goldberg et al. |
| 8,418,249 | B1 | 4/2013 | Nucci et al. |
| 9,094,288 | B1 | 7/2015 | Nucci et al. |
| 9,264,444 | B2 | 2/2016 | Moore et al. |
| 9,330,262 | B2 | 5/2016 | Salehie et al. |
| 9,390,260 | B2 | 7/2016 | Tan et al. |
| 9,516,053 | B1 | 12/2016 | Muddu et al. |
| 9,565,201 | B2 | 2/2017 | Compagna et al. |
| 9,569,959 | B1 | 2/2017 | Sprague |
| 9,680,855 | B2 | 6/2017 | Schultz et al. |
| 9,690,938 | B1 | 6/2017 | Saxe et al. |
| 9,705,904 | B1 | 7/2017 | Davis |
| 9,742,794 | B2 | 8/2017 | Cabrera et al. |
| 9,800,590 | B1 | 10/2017 | Gates et al. |
| 9,910,986 | B1 | 3/2018 | Saxe |

(Continued)

OTHER PUBLICATIONS

Cois CA, Kazman R. Natural Language Processing to Quantify Security Effort in the Software Development Lifecycle, InSEKE 2015 (pp. 716-721). (Year: 2015).

(Continued)

*Primary Examiner* — Tae K Kim

(57) ABSTRACT

A system for dynamically updating threat models based on static application security testing results. The system electronically executes an AI model using a first SAST result and a first threat model as input. The AI model is configured to identify missing security policies corresponding to the first connection mapping associated between the first resource and a second resource as output. The missing security policies remedy the first potential security vulnerability. The system further dynamically transforms the first threat model to generate a sanitized version that remedies the first potential security vulnerability. The sanitized version of the first threat model includes missing security policies that remedy the first potential security vulnerability.

20 Claims, 3 Drawing Sheets

(56) References Cited

U.S. PATENT DOCUMENTS

| | | | |
|---|---|---|---|
| 9,979,743 B2 | 5/2018 | Hovor et al. | |
| 10,200,399 B2 | 2/2019 | Agarwal | |
| 10,216,938 B2 | 2/2019 | Reith et al. | |
| 10,230,326 B2 | 3/2019 | Tiwari et al. | |
| 10,298,555 B2 | 5/2019 | Murray | |
| 10,318,735 B2 | 6/2019 | Saxe | |
| 10,339,472 B2 | 7/2019 | Sadaghiani et al. | |
| 10,348,759 B2 | 7/2019 | Sultan et al. | |
| 10,425,429 B2 | 9/2019 | Bassett | |
| 10,432,671 B2 | 10/2019 | Joseph et al. | |
| 10,459,593 B2 | 10/2019 | Tiwari et al. | |
| 10,476,902 B2 | 11/2019 | Holzhauer et al. | |
| 10,574,675 B2 | 2/2020 | Peppe et al. | |
| 10,594,712 B2 | 3/2020 | Mestha et al. | |
| 10,621,527 B2 | 4/2020 | Tiwari et al. | |
| 10,652,266 B1 | 5/2020 | Tautschnig et al. | |
| 10,681,071 B1 | 6/2020 | Pendergast et al. | |
| 10,713,358 B2 | 7/2020 | Sikorski | |
| 10,740,469 B2 | 8/2020 | Zheng et al. | |
| 10,756,830 B2 | 8/2020 | Tiwari et al. | |
| 10,855,717 B1 | 12/2020 | Feiman | |
| 10,928,785 B2 | 2/2021 | Tiwari et al. | |
| 11,036,897 B2 | 6/2021 | Tiwari et al. | |
| 11,314,503 B2 | 4/2022 | Richman et al. | |
| 11,658,990 B2 | 5/2023 | Shapoury | |
| 11,770,404 B2 | 9/2023 | McNee et al. | |
| 11,799,898 B2 | 10/2023 | Humphrey et al. | |
| 11,985,142 B2 | 5/2024 | Lawson | |
| 12,111,933 B2 | 10/2024 | Bishop, III et al. | |
| 12,625,686 B1 * | 5/2026 | Maher | G06F 8/433 |
| 2007/0162890 A1 | 7/2007 | Meier et al. | |
| 2015/0222708 A1 | 8/2015 | Addepalli et al. | |
| 2015/0347480 A1 | 12/2015 | Smart | |
| 2015/0370560 A1 | 12/2015 | Tan et al. | |
| 2015/0373043 A1 | 12/2015 | Wang et al. | |
| 2016/0364927 A1 | 12/2016 | Barry | |
| 2017/0017793 A1 | 1/2017 | Davis | |
| 2017/0230179 A1 | 8/2017 | Mannan et al. | |
| 2017/0244741 A1 | 8/2017 | Ferrer | |
| 2017/0372071 A1 | 12/2017 | Saxe | |
| 2018/0075168 A1 | 3/2018 | Tiwari et al. | |
| 2018/0351987 A1 | 12/2018 | Patel et al. | |
| 2019/0019398 A1 | 1/2019 | Hender et al. | |
| 2019/0052665 A1 | 2/2019 | Mahieu | |
| 2019/0173904 A1 | 6/2019 | Wang | |
| 2019/0207967 A1 | 7/2019 | Vashisht | |
| 2019/0369890 A1 | 12/2019 | Danilov | |
| 2020/0076835 A1 | 3/2020 | Ladnai | |
| 2020/0137103 A1 | 4/2020 | Ngo | |
| 2020/0302058 A1 | 9/2020 | Kenyon | |
| 2021/0258392 A1 | 8/2021 | Tiwari et al. | |
| 2021/0357507 A1 | 11/2021 | Sulatycki et al. | |
| 2021/0400071 A1 | 12/2021 | Ray | |
| 2021/0406152 A1 * | 12/2021 | Quemy | G06F 11/3604 |
| 2022/0129561 A1 | 4/2022 | Shivanna | |
| 2022/0131887 A1 | 4/2022 | Ngweta | |
| 2022/0147815 A1 | 5/2022 | Conwell et al. | |
| 2023/0038196 A1 | 2/2023 | Labreche | |
| 2023/0252158 A1 | 8/2023 | Bishop, III | |
| 2023/0289604 A1 | 9/2023 | Chan et al. | |
| 2023/0319097 A1 * | 10/2023 | Murphy | G06F 21/566 |
| 2024/0244068 A1 * | 7/2024 | Crabtree | H04L 9/50 |
| 2024/0378297 A1 * | 11/2024 | Peng | G06F 11/36 |
| 2026/0111561 A1 * | 4/2026 | Bazalii | G06F 21/552 |
| 2026/0170144 A1 * | 6/2026 | Santhanagopal | G06F 21/577 |

OTHER PUBLICATIONS

Mimura M, Ito R. Applying NLP techniques to malware detection in a practical environment. International Journal of Information Security. Apr. 2021; 21(2):279-91. (Year: 2021).

* cited by examiner

SYSTEM AND METHOD FOR DYNAMICALLY UPDATING THREAT MODELS BASED ON APPLICATION SECURITY TESTING

TECHNICAL FIELD

The present disclosure relates generally to information security and vulnerability assessment of software applications, and more particularly, to a system and method for dynamically updating existing threat models based on application security testing.

BACKGROUND

Threat modeling is a process through which security vulnerabilities within a software application are identified, detailed, and prioritized. In particular, generating a threat model for a given software application typically involves decomposing the application (for example, into a data flow diagram) to gain an understanding of the application and how it interacts with external entities. Existing threat models do not take into consideration evolving or new threats that may be able to utilize security flaws in existing threat models and thus evade security measures associated with the existing threat models. Because existing threat models do not consider evolving or new threats, this may result in a malicious attack on resources (with security flaws or missing security policies) associated with the threat model. Such malicious attacks may lead to system downtime and the unavailability of system processes and information, and in some cases may also lead to system failure and breakdown of network operations. Additionally, significant effort may be expended in investigating all of the (potentially thousands of) existing threat models to determine the source of the malicious attack.

SUMMARY

The disclosed system, described in the present disclosure, is particularly integrated into a practical application of an artificial intelligence (AI) model to automatically and efficiently identify missing security policies in existing threat models that may be impacted by the discovery of a new threat that was not known at the time the threat models were generated. This practical application provides several technical advantages, including providing a threat model evaluation device that identifies potential security vulnerabilities (i.e., new threats or new malicious attacks) associated with organizational resources (e.g., web applications). Further, an AI model trained to identify missing security policies that remedy the potential security vulnerabilities. Additionally, the threat model evaluation device dynamically transforms an existing threat model (with potential security vulnerabilities) to generate a sanitized version of the existing threat model (including security policies) that remedies the potential security vulnerabilities (i.e., mitigates new malicious attacks). This results in protecting organizational resources from malicious attacks and avoiding a breakdown of operations because of malicious attacks. The organizational resources that may be protected by the system of the present disclosure include hardware, such as mainframes, servers, databases, networking equipment, computers, mobile devices, memory devices, web applications and the like; software that is executed by the hardware; and/or information stored or operated upon by the hardware or software.

Conventional technologies are not configured to protect the organizational resources of an organization's network from evolving or new threats. Specifically, existing threat models do not take into consideration evolving or new threats that may be able to utilize security flaws in existing threat models and thus evade security measures associated with the existing threat models. Because existing threat models do not take into consideration evolving or new threats that were not known at the time the threat models were generated, this may result in a malicious attack on resources (with security flaws) associated with the threat model. For example, a malicious attack (e.g., a new malware attack) on an organizational resource (e.g., a web application stored at an application server device) may lead to operations associated with the web application failing. For example, the operations associated with the web application may include batch-processing jobs to read and write data. When operations associated with the web application fail, it may result in a failure to execute the batch processing jobs. Further, certain other organizational resources may rely on batch processing jobs to be executed. In such a situation, since the batch processing jobs are not executed, this may result in system damage (e.g., compromised computing performance, device failure, etc.) to those organizational resources in communication with the web application. To remedy such harmful actions (i.e., system damage), the affected organizational resources must be taken offline until the root problem is identified, thus making it inaccessible until the problem is identified and remedied. When an organizational resource is taken offline, it may further cause it to shut down or go offline and thus be unavailable to provide services. This results in, for example, under-utilization of the affected organizational resource, resulting in reduced performance of the network. In a situation where multiple organizational resources may go offline; it may result in disruption of network operations across the organizational network. In some cases, the disruption of network operations across the organizational network is often associated with unnecessary data redundancy and thus reduces the overall network performance. Further, when multiple computing systems go out of service, it results in system downtime and the unavailability of system processes and information.

Thus, unlike conventional systems that are not configured to protect the organizational resources of an organization's network from evolving or new threats, the disclosed system and methods dynamically transforms an existing threat model (with potential security vulnerabilities) to generate a sanitized version of the existing threat model (including security policies) that remedies the potential security vulnerabilities (i.e., mitigates new malicious attacks). This results in avoiding a breakdown of operations associated with the organizational resources (e.g., web applications stored at an application server device) caused by failure to execute the operations (e.g., batch processing jobs) associated with the web application. When organizational resources break down, it may cause system damage to those other computing systems in communication with the organizational resources. To address such harmful actions (i.e., system damage), the affected computing systems must be taken offline until the root problem is identified, thus making it inaccessible until the problem is identified and remedied. When a computing system is taken offline, it may further cause the computing systems to shut down or go offline and thus be unavailable to provide services. This leads to increased system downtime and further requires additional resources to remediate the offline computing systems, interrupting other operations that utilize the additional resources.

Other technical benefits include minimizing system downtime due to new malware attacks and enabling faster and more effective incident response. These benefits lead to additional technical benefits such as enhanced network resilience, increased operational continuity, and faster recovery times. By proactively identifying and addressing potential issues, minimizing system downtime strengthens the overall stability and reliability of the system, reducing the likelihood of unexpected outages. Effective monitoring and rapid response mechanisms allow for quicker restoration of system functionality in case of failures, minimizing the impact of any downtime that does occur. Reduced downtime also helps prevent data loss by ensuring consistent system operation and reducing the risk of corruption during unexpected outages. Monitoring system performance during uptime enables identification of bottlenecks and potential issues, allowing for proactive optimization and improved overall system efficiency. With a robust system that minimizes downtime, entities can more easily scale operations and adapt to changing demands without significant disruptions.

Additionally, when organizational resources are affected by a malicious attack (e.g., a malware attack), the attack performs harmful actions, such as system damage. System damage occurs when the malware deletes data or modifies the source code of the organizational resource, leading to unstable or unusable systems. Another example of harmful action is data exfiltration. Data exfiltration occurs when the malware steals sensitive information (such as emails, passwords, financial information, etc.) stored in organizational resources. To remedy such harmful actions (i.e., system damage and data exfiltration), the affected organizational resource must be taken offline until the root problem is identified, thus making it inaccessible until the problem is identified and remedied. Thus, the disclosed system provides a technical solution of dynamically transforming an existing threat model (with potential security vulnerabilities) to generate a sanitized version of the existing threat model (including security policies) that remedies the potential security vulnerabilities (i.e., mitigates new malicious attacks) associated with performing the system damage before the attack. Accordingly, by remedying the potential security vulnerabilities before the attack, the harmful action of system damage is evaded, thus saving downtime associated with affected organizational resources and additionally saving resources that would otherwise be necessary to remediate affected organizational resources, which in turn provides uninterrupted operations of the organization. This leads to improved operational efficiency of organizational resources because the organizational resources are not required to be taken offline for remediation. Other examples of harmful actions that the disclosed system is able to evade before an attack may include service disruption of the organization's resources, data espionage, and identity theft.

In this manner, certain embodiments may enable remedying the potential security vulnerabilities sooner than otherwise, thereby helping to reduce the probability that such vulnerabilities are identified by bad actors and used to gain access to the system. In particular, certain embodiments may aid in providing improved security to a computer system, by helping to reduce the likelihood of virus and/or malware infections. This in turn may (1) conserve processing and memory resources that would otherwise be consumed by the viruses/malware operating within the system, (2) allow the software installed on that system to run faster and smoother, avoiding system crashes/failures that may be caused by the viruses/malware, (3) conserve networking resources that may otherwise be expended by the virus/malware communicating with other systems (e.g., in an attempt to infect those other systems), and (4) protect data stored within the system from corruption by the viruses/malware, avoiding the need to expend computational resources in reproducing corrupted data.

In this manner, conserving considerable computational resources that would otherwise be expended as part of an external review process during which, each time a new malware attack is identified, every threat model in the system is investigated to determine whether the associated organizational resource is susceptible to the new threat, and, accordingly, whether the threat model should be updated to reflect the new threat. In particular, given that organizations are typically only able to direct a finite amount of resources towards security of organizational resources, focusing those resources on the threat models and associated organizational resources that are likely impacted by a newly identified new malware attack means that potential security vulnerabilities may be resolved sooner than would otherwise be the case, thereby reducing the likelihood that the vulnerability is identified and used by viruses/malware to gain access to the computer system.

In some embodiments, a system for dynamically updating threat models based on static application security testing results includes a memory operably coupled with a processor. The memory is configured to store an artificial intelligence (AI) algorithm, a threat model database, and a static application security testing (SAST) results database. The threat model database stores a plurality of threat models and the SAST results database stores SAST results associated with testing a source code corresponding to each of a plurality of resources. The processor is configured to access a first threat model from the plurality of threat models and identify a first resource from the first threat model. The first threat model at least indicates a first connection mapping associated between the first resource and a second resource of the plurality of resources. The processor is further configured to identify a first SAST result associated with the first resource from the SAST results stored in the SAST results database. The first SAST result indicates a first potential security vulnerability of the first resource while communicating with the second resource caused by unchecked data-flows of the source code of the first resource.

The processor is configured to collect a first data set comprising the plurality of threat models stored in the memory and collect a second data set comprising the SAST results stored in the SAST results database. The processor is configured to create a modified first data set by annotating a first set of threat models of the plurality of threat models, wherein the annotations indicate a missing security policy associated with each of the first set of threat models. The processor is configured to create a first training set comprising the first data set, the second data set, and the modified first data set and train the AI algorithm in a first stage using the first training set. The processor is further configured to create a second training set for a second stage of training. The second training set comprises the first training set and incorrectly identified missing security policy associated with the first set of threat models after the first stage of training and retrain the AI algorithm in a second stage using the second training set, to generate an AI model.

The processor is further configured to electronically execute the AI model using the first SAST result and the first threat model as an input. The AI model is configured to identify one or more missing security policies corresponding with the first connection mapping associated between the first resource and the second resource as output. The one or more missing security policies remedy the first potential security vulnerability. The processor is further configured to identify one or more second threat models from the plurality of threat models that includes another connection mapping associated between a third resource and a fourth resource in response to identifying the one or more missing security policies. The first resource and the third resource are a first type of resource and the second resource and the fourth resource are a second type of resource. The one or more second threat models include the first potential security vulnerability. The processor is further configured to dynamically transform the first threat model and the one or more second threat models to generate a sanitized version of the first threat model and the one or more second threat models that remedies the first potential security vulnerability in response to identifying the one or more second threat models. The sanitized version of the first threat model and the one or more second threat models includes the one or more missing security policies that remedy the first potential security vulnerability.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of embodiments of the disclosure and the potential advantages thereof, reference is now made to the following written description taken in conjunction with the accompanying drawings, in which.

DETAILED DESCRIPTION OF THE DRAWINGS

Figure 1:
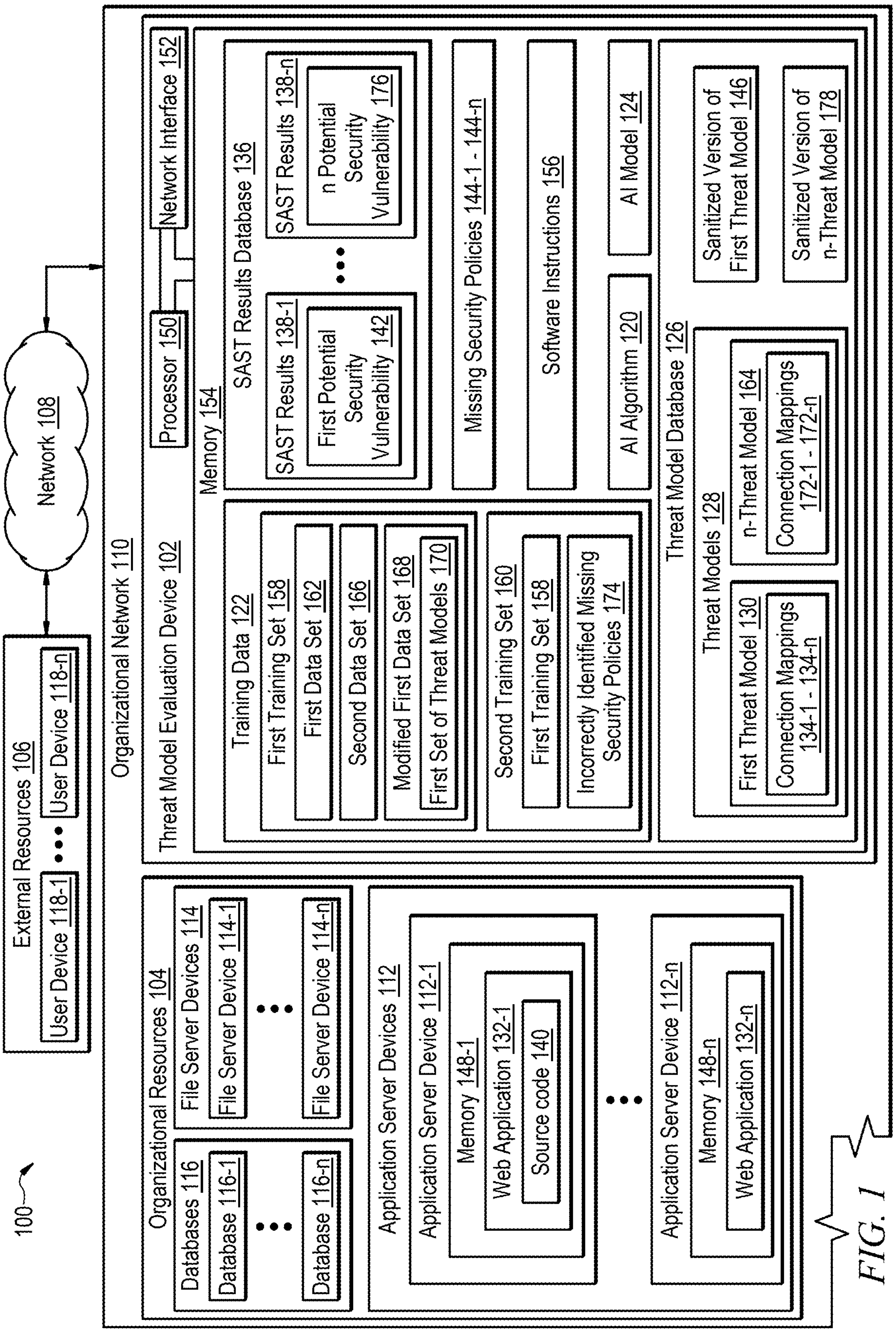
FIG. 1 is a schematic diagram of a system, in accordance with an embodiment of the present disclosure.

As described above, conventional technologies fail to provide reliable network communications between the organizational resources of an organization network. Embodiments of the present disclosure and its advantages may be understood by referring to FIGS. 1-2B. FIGS. 1-2B is used to describe systems and methods for predicting and remedying network dependency anomalies, according to some embodiments.

System Overview

FIG. 1 is a schematic diagram of a system 100, in accordance with certain aspects of the present disclosure. As shown, system 100 includes a threat model evaluation device 102, organizational resources 104, external resources 106 operably connected to one another and communicating via a network 108. Network 108 enables communication among the components of the system 100. In other embodiments, system 100 may include other elements instead of, or in addition to, those listed above. The threat model evaluation device 102 and the organizational resources 104 are part of an organizational network 110. The organizational resources 104 include application server devices 112-1 to **112-*n*, file server devices 114-1 to 114-*n*, and databases 116-1 to 116-*n*. The external resources 106 include user devices 118-1 to 118-*n***.

The application server devices 112-1 to **112-*n* are collectively also referred to as the application server devices 112. The file server devices 114-1 to 114-*n* are collectively also referred to as the file server devices 114. The databases 116-1 to 116-*n* are collectively also referred to as the databases 116**.

In general, the working of system 100 is initiated by the threat model evaluation device 102 and is performed in two phases. In the first phase, the threat model evaluation device 102 trains the AI algorithm 120 using training data 122 to generate an AI model 124. This AI model 124 is utilized in the second phase. In the second phase, threat model evaluation device 102 then electronically executes the AI model 124 (explained in detail below).

Specifically, the threat model evaluation device 102 accesses a threat model database 126. The threat model database 126 stores a plurality of threat models 128. Each of the plurality of threat models 128 is a flow diagram that represents a plurality of connection mappings 134-1 to **134-*n* between organizational resources 104 and/or between each of the organizational resources 104 and the external resources 106. Further, each of the connection mappings 134-1 to 134-*n* indicates a type of connection established between organizational resources 104 and/or external resources 106. For example, a first threat model 130 of the plurality of threat models 128 may include a first connection mapping 134-1 between one of the organizational resources 104 (e.g., web application 132-1) and one of the external resources 106 (e.g., a user device 118-1) communicating with each other over a Hypertext Transfer Protocol Secure (HTTPS) connection. Next, for the web application 132-1 (i.e., one of the organizational resources 104), the threat model evaluation device 102 accesses the static application security testing (SAST) results database 136 to identify a SAST result 138-1 that corresponds with the web application 132-1. The SAST database 136 stores a plurality of SAST results 138-1 to 138-*n*. Each of the SAST results 138-1 to 138-*n* corresponds to one of the organizational resources 104. Each of the SAST results 138-1 to 138-*n* is generated by analyzing a source code (e.g., source code 140) associated with the organizational resources 104. For example, the SAST result 138-1 that corresponds to web application 132-1 is generated by analyzing the source code 140 associated with web application 132-1. The SAST result 138-1 identifies a first potential security vulnerability 142 associated with the web application 132-1 while communicating with user device 118-1 caused by unchecked dataflows of the source code 140. In this example, the first potential security vulnerability 142 identifies a potential for a new malware attack over the HTTPS connection between the web application 132-1 and the user device 118-1. For example, the new malware attack is a cross-site request forgery attack that may be conducted over the HTTPS connection. Accordingly, when the threat model 130 was generated, it was not known at that time that a malware attack (such as a cross-site request forgery attack) may be performed over an HTTPS connection. Thus, the SAST result 138-1 identifies that the HTTPS connection between the web application 132-1 and the user device 118-1 is susceptible to the first potential security vulnerability 142** (i.e., a cross-site request forgery (CSRF) attack).

The threat model evaluation device 102 then electronically executes the AI model 124 using the SAST result 138-1 and the first threat model 130 as input. The AI model 124 is configured to identify as output a missing security policy 144-1 that remedies the first potential security vulnerability 142 corresponding with the first connection mapping 134-1 associated between the web application 132-1 and the user device 118-1. Next, the threat model evaluation device 102 dynamically transforms the first threat model 130 to generate a sanitized version of the first threat model 146 including the missing security policy 144-1 that remedies the first potential security vulnerability 142.

For example, the missing security policy 144-1 is to perform a CSRF token matching that prevents CSRF attacks. As part of the CSRF token matching, every time a user device 118-1 sends an access request or submits data to the web application 132-1, the CSRF token matching (i.e., missing security policy 144-1) is configured to check if a CSRF token sent by the user device 118-1 matches the CSRF token associated with a session of user device 118-1 with the web application 132-1. If both these CSRF tokens match, then it is determined that there is no CSRF attack, and the access request is allowed. However, if both these CSRF tokens do not match (i.e., token mismatch), then it is determined there is potentially a CSRF attack and the user device 118-1 is potentially a bad actor and the access request is denied.

System Components

Organizational Network

The organizational network 110 includes organizational resources 104 and the threat model evaluation device 102 that are associated with an organization. The organizational network 110 is in communication with external resources 106. The external resources 106 include user devices 118-1 to **118-*n* via network 108. In some embodiments, the organizational network 110 may be an internal network of the organization and may include all or a portion of a private data network, a local area network (LAN), a metropolitan area network (MAN), a wide area network (WAN), a local or regional communication or computer network, wireline or wireless network, an enterprise intranet, or any other suitable communication link, including combinations thereof, operable to facilitate communication between threat model evaluation device 102 and organizational resources 104**.

Organizational Resources

The organizational resources 104 include application server devices 112, file server devices 114, and databases 116. The organizational resources 104 of the system 100 of the present disclosure include hardware, such as mainframes, servers, databases, networking equipment, computers, mobile devices, memory devices, web applications, and the like; software that is executed by the hardware; and/or information stored or operated upon by the hardware or software. The application server devices 112, file server devices 114, and databases 116 may generally be any device configured to process data. Additionally, application server devices 112-1 to **112-*n* each store corresponding web applications 132-1 to 132-*n*. For example, application server device 112-1 stores memory 148-1. The memory 148-1 stores the web application 132-1. Similarly, application server device 112-*n* stores memory 148-*n*, and memory 148-*n* stores the web application 132-*n***.

Threat Model Evaluation Device

The threat model evaluation device 102 includes a processor 150 and a network interface 152 in signal communication with a memory 154. Memory 154 stores software instructions 156 that, when executed by processor 150, cause processor 150 to perform one or more operations of the threat model evaluation device 102 described herein.

Processor

Processor 150 includes one or more processors. Processor 150 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors are configured to execute instructions (e.g., software instructions 156) to perform the operations of the threat model evaluation device 102 described herein. The processor 150 is configured to operate as described in FIGS. 2A-2B. For example, processor 150 may be configured to perform one or more operations of method 200 as described in FIGS. 2A-2B.

Network Interface

The network interface 152 may include an NFC interface, a Bluetooth® interface, a Zigbee® interface, a Z-wave® interface, a radio-frequency identification (RFID®) interface, a WIFI® interface, a local area network (LAN) interface, a wide area network (WAN) interface, a metropolitan area network (MAN) interface, a personal area network (PAN) interface, a wireless PAN (WPAN) interface, a modem, a switch, and/or a router. Network interface 152 is configured to enable wired and/or wireless communications. The network interface 152 may be configured to communicate data between the threat model evaluation device 102 and other devices, systems, or domains. The processor 150 may be configured to send and receive data using the network interface 152 and/or the organizational network 110. The network interface 152 may be configured to use any suitable type of communication protocol.

Memory

The memory 154 may be volatile or non-volatile and may comprise read-only memory (ROM), random-access memory (RAM), ternary content-addressable memory (TCAM), dynamic random-access memory (DRAM), and static random-access memory (SRAM). The memory 154 may include one or more of a local database, a cloud database, a network-attached storage (NAS), etc. The memory 154 comprises one or more disks, tape drives, or solid-state drives and may be used as an over-flow data storage device to store programs when such programs are selected for execution and to store instructions and data that are read during program execution. Memory 154 may store any of the information described in FIGS. 2A-2B along with any other data, instructions, logic, rules, or code operable to implement the function(s) described herein when executed by processor 150. For example, memory 154 may store training data 122, threat model database 126, SAST results database 136, AI algorithm 120, AI model 124, software instructions 156, missing security policies 144-1 to **144-*n*, and/or any other data or instructions. The software instructions 156 may include any suitable set of instructions, logic, rules, or code operable to execute the processor 150 and perform the functions described herein, such as some or all of those described in FIGS. 2A-2B**.

Network

Network 108 may be any suitable type of wireless and/or wired network. The network 108 may be connected to the Internet or public network. Network 108 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., Wireless Fidelity (WiFi®), Wireless Gigabit (WiGig®), Worldwide Interoperability for Microwave Access (WiMAX®), etc.), a long-term evolution (LTE) network, a universal mobile telecommunications system (UMTS) network, a peer-to-peer (P2P) network, a Bluetooth® network, a near-field communication (NFC) network, and/or any other suitable network. The network 108 may be configured to support any suitable type of communication protocol, as would be appreciated by one of ordinary skills in the art. The organizational network 110 and the external resources 106 communicate with each other using the network 108.

External Resources

The external resources 106 include user devices 118-1 to **118-*n*. The user devices 118-1 to 118-*n* includes but are not limited to, a personal computer, a desktop computer, a workstation, a server, a laptop, a tablet computer, a mobile phone (such as a smartphone), an Internet-of-Things (IoT) device, or any other suitable type of device. The user devices 118-1 to 118-*n* may include a user interface, such as a display, a microphone, a camera, a keypad, or other appropriate terminal equipment usable by a user. In an embodiment, the external resources 106** may also include third-party service providers. Such third-party service providers may provide cloud services and the third-party service providers may include server devices, databases, application servers, or any other server devices utilized to provide cloud services.

Initiate Identifying Missing Security Policies in Existing Threat Models

The system 100 initiates automatically and efficiently identifying missing security policies 144-1 to **144-*n* from existing threat models (e.g., threat models 128) in two phases. In a first stage, the artificial intelligence (AI) algorithm 120 is trained by utilizing the training data 122. The AI algorithm 120 is used to generate an AI model 124. The AI model 124 is generated by utilizing the trained AI algorithm 120. Specifically, the AI model 124 is a software program that is configured by the processor 150 to utilize the trained AI algorithm 120 to identify missing security policies 144-1 to 144-*n* from existing threat models (e.g., threat models 128). This AI model 124 is utilized in the second phase (explained in detail below). In the second phase, the threat model evaluation device 102 then electronically executes the AI model 124 using the SAST result 138-1 and the first threat model 130 as input. The AI model 124 is configured to identify as output a missing security policy 144-1 that remedies the first potential security vulnerability 142 corresponding with the first connection mapping 134-1 associated between the web application 132-1 and the user device 118-1**. The first stage is now explained in detail below.

First Stage:

Access Threat Models Stored in Memory

Processor 150 of the threat model evaluation device 102 is configured to access a threat model database 126. The threat model database 126 stores a plurality of threat models 128. Each of the plurality of threat models 128 is a flow diagram representing a plurality of connection mappings 134-1 to **134-*n* between the organizational resources 104 and/or between each of the organizational resources 104 and the external resources 106. Further, each of the connection mappings 134-1 to 134-*n* indicates a type of connection established between organizational resources 104 and/or external resources 106. In an embodiment, for example, processor 150 of the threat model evaluation device 102 is configured to access a first threat model 130 of the plurality of threat models 128 may include a connection mapping 134-1 between one of the organizational resources 104 (e.g., web application 132-1) and one of the external resources 106 (e.g., a user device 118-1) communicating with each other over an HTTPS connection. Further, the connection mapping 134-1 includes an identifier associated with each of the organizational resources 104 and the external resources 106. These identifiers are unique identifiers that uniquely identify the organizational resources 104 and the external resources 106. For example, web application 132-1** may have an identifier of "WBAP1".

In another embodiment, the first threat model 130 may include a connection mapping **134-*n* between one of the organizational resources 104 (e.g., web application 132-1) and a database 116-1 of the plurality of databases 116 communicating with each other over an HTTPS connection. In another embodiment, the n-threat model 164 may include a connection mapping 172-1 between one of the organizational resources 104 (e.g., web application 132-*n*) and a file server device 114-1 of the plurality of file server devices 114** communicating with each other over an HTTPS connection.

Identify SAST Results

Processor 150 of the threat model evaluation device 102 is configured to identify SAST results (e.g., SAST result 138-1) associated with organizational resources 104 (e.g., web application 132-1) from the SAST results 138-1 to **138-*n* stored in the SAST results database 136. Specifically, processor 150 accesses the SAST results database 136 to identify a SAST result 138-1 that corresponds with the web application 132-1 associated with the first threat model 130. The SAST database 136 stores a plurality of SAST results 138-1 to 138-*n*. Each of the SAST results 138-1 to 138-*n* corresponds to one of the organizational resources 104. The SAST results 138-1 to 138-*n* are generated by analyzing a source code (e.g., source code 140) associated with each of the organizational resources 104. For example, the SAST result 138-1 that corresponds to web application 132-1 is generated by analyzing the source code 140 associated with web application 132-1**.

The SAST result 138-1 identifies a first potential security vulnerability 142 associated with the web application 132-1 while communicating with the user device 118-1, caused by unchecked data-flows of the source code 140. In this example, the first potential security vulnerability 142 identifies a potential for a new malware attack over the HTTPS connection between the web application 132-1 and the user device 118-1. For example, the new malware attack is a cross-site request forgery attack that may be conducted over the HTTPS connection. Accordingly, when the threat model 130 was generated, it was not known at that time that a malware attack (such as a cross-site request forgery (CSRF) attack) may be performed over an HTTPS connection. HTTPS encrypts the communication between a browser of user device 118-1 and the web application 132-1, protecting the data transmitted, but it does not prevent an attacker from tricking the browser of the user device 18-1 into sending a request to a vulnerable site. CSRF attacks utilize the trust a website has in its authenticated users, allowing an attacker to force a user to perform actions they did not intend. Thus, the SAST result 138-1 identifies that the HTTPS connection between the web application 132-1 and the user device 118-1 is susceptible to the first potential security vulnerability 142 (i.e., CSRF attack).

The SAST results database 136 stores each of the SAST results 138-1 to **138-*n* with a corresponding unique identifier of the organizational resources 104 with which it is associated. For example, SAST result 138-1 corresponds to web application 132-1, and thus the SAST results database 136 stores the SAST result 138-1 with the unique identifier of "WBAP1" associated with the web application 132-1. Next, processor 150 performs a lookup operation on the SAST results database 136 to identify a corresponding SAST results 138-1 to 138-***n* associated with one of the organizational resources 104. For example, to identify a SAST result 138-1 associated with web application 132-1, the processor 150 looks up the identifier "WBAP1" associated with web application 132-1 from the SAST results 138-1 to 138-*n* stored in the SAST results database 136. When processor 150 identifies a match i.e., identifies that the SAST result 138-1 has the same identifier of "WBAP1", then processor 150 determines that the SAST result 138-1 is associated with the web application 132-1.

Training the AI Algorithm and AI Model

The AI algorithm 120 is trained using training data 122. The training data 122 includes two data sets, a first training set 158 and a second training set 160. Processor 150 is configured to collect the first data set 162 by accessing the threat models 128 stored in the memory 154. The first data set 162 includes the plurality of threat models 128 (e.g., first threat model 130 to n-threat model 164). Next, processor 150 is configured to collect a second data set 166 by accessing the SAST results database 136. The second data set 166 includes the plurality of SAST results 138-1 to 138-*n* stored in the SAST results database 136. The processor 150 is configured to create a modified first data set 168 by annotating a first set of threat models 170 of the plurality of threat models 128. For example, the first set of threat models 170 includes the first threat model 130 with connection mappings 134-1 to 134-*n* and n-threat model 164 with connection mappings 172-1 to 172-*n*. Each of the annotations indicates a corresponding one of the missing security policies 144-1 to 144-*n*, corresponding to one of the connection mappings (e.g., 134-1 to 134-*n*) associated with the first set of threat models 170 (e.g., first threat model 130). The processor 150 is configured to create a first training set 158 that includes the first data set 162, the second data set 166, and the modified first data set 168. The AI algorithm 120 is trained in a first stage using the first training set 158 to identify missing security policies 144-1 to 144-*n* from existing threat models 128. Further, processor 150 is configured to create a second training set 160 for a second stage of training. The second training set 160 includes the first training set 158 and any incorrectly identified missing security policies 174 from the missing security policies 144-1 to 144-*n* corresponding to one of the connection mappings (e.g., 134-1 to 134-*n*) associated with the first set of threat models 170 (e.g., first threat model 130) after the first stage of training. Processor 150 re-trains the AI algorithm 120 in a second stage using the second training set 160 to create a trained AI algorithm 120. The processor 150 is configured to iteratively perform the second stage of training to re-train the AI algorithm 120 until the AI algorithm 120 is trained to a satisfactory level, such that the number of incorrectly identified missing security policies 174 is below a threshold value that satisfies the training accuracy of the AI algorithm 120. Processor 150 is configured to utilize the trained AI algorithm 120 to generate the AI model 124. Specifically, the AI model 124 is a software program that is configured by the processor 150 to utilize the trained AI algorithm 120 to identify missing security policies 144-1 to 144-*n* from existing threat models (e.g., threat models 128).

The AI algorithm 120 may include a support vector machine, machine learning, neural network, random forest, a large language model (LLM) algorithm, deep learning algorithm, k-means clustering, Tree-based algorithm, Random Forest algorithm, convolutional neural network (CNN), deep neural network (DNN), recurrent neural network (RNN), Naïve Bayes classification, etc. In some embodiments, the AI algorithm 120 may include a data processing machine learning algorithm. The AI algorithm 120 may be implemented by supervised, semi-supervised, and/or unsupervised machine learning. In another embodiment, processor 150 executes the AI algorithm 120 to identify missing security policies 144-1 to 144-*n* from existing threat models (e.g., threat models 128). In another embodiment, processor 150 executes software instructions 156 and is configured to identify missing security policies 144-1 to 144-*n* from existing threat models (e.g., threat models 128) without utilizing AI algorithm 120. Here, the first stage is completed.

Second Stage: Execute AI Model

Processor 150 executes the AI model 124 to perform operations to identify missing security policies 144-1 to 144-*n* for the existing threat models (e.g., threat models 128). Specifically, processor 150 of the threat model evaluation device 102 electronically executes the AI model 124 using as input one of the SAST results 138-1 to 138-*n* and a corresponding one of the threat models 128 associated with the one of the SAST results 138-1 to 138-*n*. The AI model 124 is configured to identify as output missing security policy 144-1 to 144-*n* that remedies the potential security vulnerabilities (e.g., first potential security vulnerability 142 to n-potential security vulnerability 176) corresponding with one of the SAST results 138-1 to 138-*n*.

In an embodiment, processor 150 of the threat model evaluation device 102 electronically executes the AI model 124 using the SAST result 138-1 and the first threat model 130 as input. The AI model 124 is configured to identify as output a missing security policy 144-1 that remedies the first potential security vulnerability 142 corresponding with the first connection mapping 134-1 associated between the web application 132-1 and the user device 118-1. The missing security policy 144-1 remedies the first potential security vulnerability 142.

Identifying Second Threat Models

Processor 150 of the threat model evaluation device 102 is configured to identify one or more second threat models (e.g., n-threat model 164) from the plurality of threat models 128 that includes another connection mapping (e.g., connection mapping 172-1) that indicates a connection established between organizational resources 104 and/or external resources 106.

In an embodiment, in response to identifying the missing security policy 144-1 that remedies the first potential security vulnerability 142 corresponding with the first connection mapping 134-1, the processor 150 is configured to scan the threat models 128. Similar to the connection mapping 134-1 associated with first threat model 130, processor 150 identifies (based on the scan) other connection mappings associated with those threat models (i.e., one or more second threat models) from the threat models 128 that also establish an HTTPS connection between the web application 132-1 and the user device 118-1. The scanning is performed based on a type of resource associated with the first connection mapping 134-1. For example, the first connection mapping 134-1 includes two resources, the web application 132-1 and the user device 118-1, here web application 132-1 is a first type of resource and user device 118-1 is a second type of resource. Thus, processor 150 scans the connection mappings of the threat models 128 to identify other web applications (i.e., first type of resource) connected to other user devices (i.e., second type of resource) over HTTPS connection. In response to scanning the processor 150 determines, for example, n-threat model 164 (also interchangeably referred to as a second threat model 164) to include a connection mapping 172-1 that establishes an HTTPS connection between the web application **132-*n* (i.e., a first type of resource) and the user device 118-*n* (i.e., a second type of resource), similar to the connection mapping 134-1 associated with first threat model 130 that also establishes an HTTPS connection between the web application 132-1 and the user device 118-1. Additionally, the n-threat model 164 (also interchangeably referred to as a second threat model 164) that establishes an HTTPS connection between the web application 132-*n* and the user device 118-*n* also includes the first potential security vulnerability 142 that identifies a potential for a new malware attack over the HTTPS connection between the web application 132-*n* and the user device 118-*n*. Similar to first threat model 130, when the n-threat model 164** was generated, it was not known at that time that a malware attack (such as a cross-site request forgery attack) may be performed over an HTTPS connection.

By identifying vulnerabilities associated with the second threat model 164 based on identifying vulnerabilities in the first threat model 130, this provides a technical improvement in proactively searching for evidence of the vulnerabilities associated with organizational resources 104 over the existing techniques, where the vulnerabilities are identified after an attack. In response to determining vulnerabilities on the second threat model 164, the disclosed system may proactively remedy the threat associated with such as vulnerabilities. In particular, given that organizations are typically only able to direct a finite amount of resources towards security of organizational resources 104, focusing those resources on specific threat models (such as first threat model 130 and second threat model 164) that are likely impacted by the newly identified new malware attack means that vulnerabilities may be resolved sooner than would otherwise be the case, thereby reducing the likelihood that the vulnerability is identified and used by viruses/malware to gain access to the organizational resources 104.

Dynamically Transform the Threat Models

Processor 150 of the threat model evaluation device 102 is configured to dynamically transform the first threat model 130 and the n-threat model 164 (also interchangeably referred to as second threat model 164) to generate a sanitized version of the first threat model 146 and a sanitized version of the n-threat model 178 that remedies the first potential security vulnerability 142 associated with both the first threat model 130 and the n-threat model 164. The sanitized version of the first threat model 146 and a sanitized version of the n-threat model 178 both include the missing security policy 144-1 that remedies the first potential security vulnerability 142.

For example, the first threat model 130, before being transformed, includes a connection mapping 134-1 (that is vulnerable to CSRF attacks) associated with the first threat model 130 that establishes an HTTPS connection between the web application 132-1 and the user device 118-1. Further, after dynamically transforming the first threat model 130, the sanitized version of the first threat model 146 (that is not vulnerable to CSRF attacks) includes an HTTPS connection between the web application 132-1 and the user device 118-1, as well as the missing security policy 144-1 that remedies the first potential security vulnerability 142. For example, the missing security policy 144-1 is to perform a CSRF token matching that prevents CSRF attacks. As part of the CSRF token matching, every time a user device 118-1 sends an access request or submits data to the web application 132-1, the CSRF token matching (i.e., missing security policy 144-1) is configured to check if a CSRF token sent by the user device 118-1 matches the CSRF token associated with a session of user device 118-1 with the web application 132-1. If both these CSRF tokens match, then it is determined that there is no CSRF attack, and the access request is thus allowed. However, if both these CSRF tokens do not match (i.e., token mismatch), then it is determined there is potentially a CSRF attack and the user device 118-1 is potentially a bad actor and the access request is denied.

Similar to the first threat model 130, after dynamically transforming the n-threat model 164, the sanitized version of the n-threat model 178 (that is not vulnerable to CSRF attacks) includes an HTTPS connection between the web application **132-*n* and the user device 118-*n*, as well as the missing security policy 144-1 that remedies the first potential security vulnerability 142**.

Thus, the disclosed system provides a technical solution of dynamically transforming first threat model 130 (i.e., an existing threat model) with first potential security vulnerability 142 to generate a sanitized version of the first threat model 146 including the missing security policy 144-1 that remedies the first potential security vulnerability 142 to mitigate the CSRF attacks (i.e., mitigates new malicious attacks) associated with performing the system damage before the attack. Accordingly, by remedying the first potential security vulnerability 142 before the attack, the harmful action of system damage is evaded, thus saving downtime associated with affected organizational resources 104 and additionally saving resources that would otherwise be necessary to remediate affected organizational resources 104, which in turn provides uninterrupted operations of the organizational network 110. This leads to improved operational efficiency of organizational resources 104 because the organizational resources 104 are not required to be taken offline for remediation. Other examples of harmful actions that the disclosed system is able to evade before an attack may include service disruption of the organizational resources 104, data espionage, and identity theft.

In an embodiment, web application 132-1 is referred to as a first resource 132-1, the user device 118-1 is referred to as a second resource 118-1. The connection mapping 134-1 is referred to as a first connection mapping 134-1 associated between the first resource 132-1 and the second resource 118-1 is an HTTPS connection. The first potential security vulnerability 142 is a CSRF attack on the web application 132-1 by the user device 118-1 using the HTTPS connection.

In an embodiment, SAST result **138-*n* identifies an n-potential security vulnerability 176 (also interchangeably referred to as a second potential security vulnerability 176) associated with the web application 132-1 while communicating with the user device 118-1, caused by unchecked data-flows of the source code 140. In this example, the second potential security vulnerability 176 indicates a missing connection mapping associated between the web application 132-1 and a database 116-1 of the plurality of databases 116. A missing connection mapping indicates that the first threat model 130 does not include a connection established between the web application 132-1 and a database 116-1. Accordingly, when processor 150 electronically executes the AI model 124 using the SAST result 138-*n* and the first threat model 130 as input. The AI model 124 is configured to identify as output a missing security policy 144-*n* that remedies the second potential security vulnerability 176 corresponding with the missing connection mapping associated between the web application 132-1 and a database 116-1. In response to identifying the missing security policy 144-*n*, processor 150 is configured to identify n-threat model 164 (also interchangeably referred to as one or more third threat models 164) from the plurality of threat models 128. Similar to the first threat model 130, the n-threat model 164 also includes the missing connection mapping associated between the web application 132-1 and a database 116-1 of the plurality of databases 116. The one or more third threat model 164 also include the second potential security vulnerability 176. In response to identifying the one or more third threat models, processor 150 dynamically transforms the first threat model 130 and the n-threat model 164 to generate the sanitized version of the first threat model 146 and a sanitized version of the n-threat model 178. The sanitized version of the first threat model 146 and sanitized version of the n-threat model 178 includes the second connection mapping established between the web application 132-1 and a database 116-1 to remedy the second potential security vulnerability 176. The missing security policy 144-*n* remedies the second potential security vulnerability 176 by establishing a connection between the web application 132-1 and a database 116-1**.

Figure 2A:
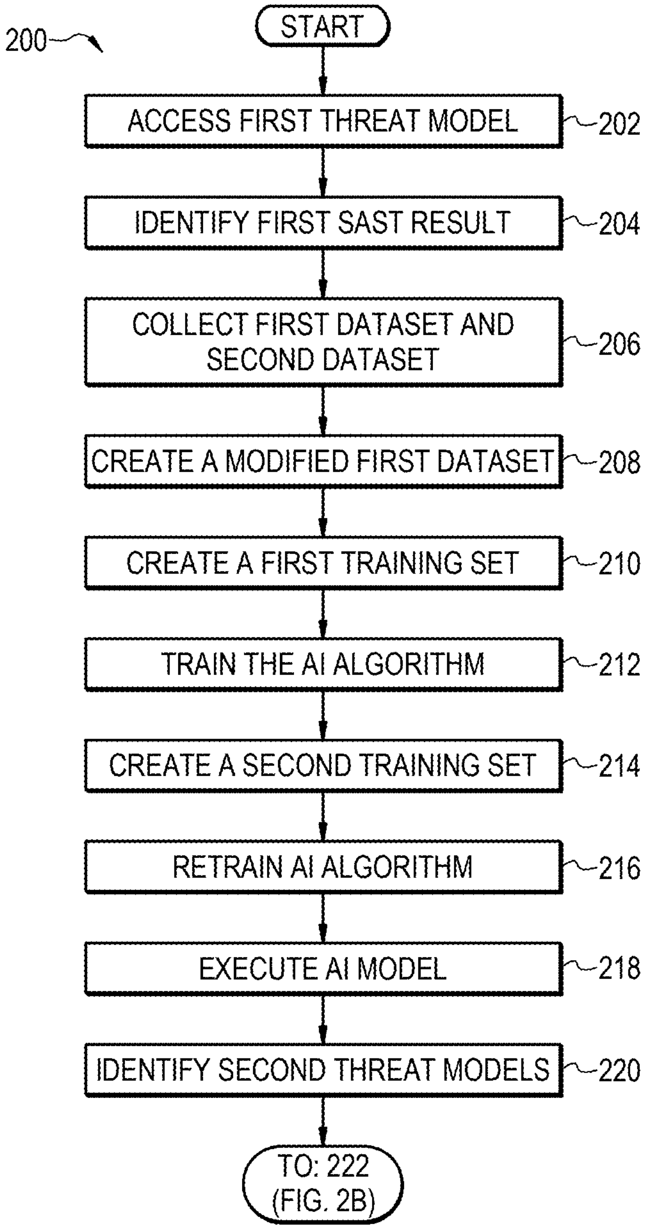
FIGS. 2A-2B illustrates an example flowchart of a method of the system of FIG. 1 for dynamically updating threat models based on static application security testing results.
Figure 2B:
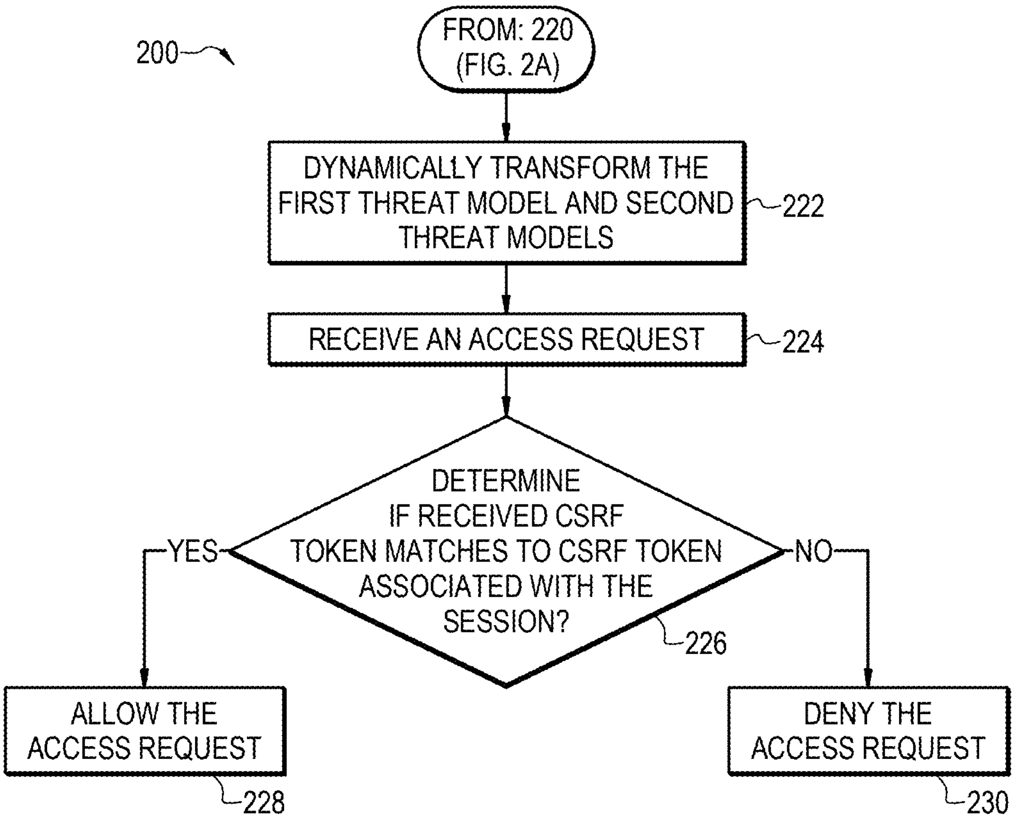

FIGS. 2A-2B illustrates an example flowchart of method 200 for dynamically updating threat models based on static application security testing results, in accordance with an embodiment of the present disclosure. For example, one or more operations of method 200 may be implemented, at least in part, in the form of software instructions 156 of FIG. 1, stored on a tangible non-transitory machine-readable medium or a computer-readable medium (e.g., memory 154 of FIG. 1) that, when run by one or more processors (e.g., processor 150 of FIG. 1) may cause the one or more processors to perform operations of the method 200.

Referring to FIG. 2A, at operation 202, processor 150 of the threat model evaluation device 102 is configured to access a first threat model 130 of the plurality of threat models 128.

At operation 204, processor 150 of the threat model evaluation device 102 is configured to identify SAST results (e.g., SAST result 138-1) associated with organizational resources 104 (e.g., web application 132-1) from the SAST results 138-1 to **138-*n* stored in the SAST results database 136**.

At operation 206, processor 150 of the threat model evaluation device 102 is configured to collect the first data set 162 by accessing the threat models 128 stored in the memory 154 and to collect a second data set 166 by accessing the SAST results database 136.

At operation 208, processor 150 of the threat model evaluation device 102 is configured to create a modified first data set 168 by annotating a first set of threat models 170 of the plurality of threat models 128.

At operation 210, processor 150 of the threat model evaluation device 102 is configured to create a first training set 158 that includes the first data set 162, the second data set 166, and the modified first data set 168.

At operation 212, processor 150 of the threat model evaluation device 102 is configured to train the AI algorithm 120 in a first stage using the first training set 158 to identify missing security policies 144-1 to **144-*n* from existing threat models 128**.

At operation 214, processor 150 of the threat model evaluation device 102 is configured to create a second training set 160 for a second stage of training. The second training set 160 includes the first training set 158 and any incorrectly identified missing security policies 174 from the missing security policies 144-1 to **144-*n* corresponding to one of the connection mappings (e.g., 134-1 to 134-*n*) associated with the first set of threat models 170 (e.g., first threat model 130**) after the first stage of training.

At operation 216, processor 150 of the threat model evaluation device 102 is configured to re-train the AI algorithm 120 in a second stage using the second training set 160 to create a trained AI algorithm 120. The processor 150 is configured to iteratively perform the second stage of training to re-train the AI algorithm 120 until the AI algorithm 120 is trained to a satisfactory level, such that the number of incorrectly identified missing security policies 174 is below a threshold value that satisfies the training accuracy of the AI algorithm 120.

At operation 218, processor 150 of the threat model evaluation device 102 is configured to electronically execute the AI model 124 using the SAST result 138-1 and the first threat model 130 as input. The AI model 124 is configured to identify as output a missing security policy 144-1 that remedies the first potential security vulnerability 142 corresponding with the first connection mapping 134-1 associated between the web application 132-1 and the user device 118-1. The missing security policy 144-1 remedies the first potential security vulnerability 142.

At operation 220, processor 150 of the threat model evaluation device 102 is configured to identify one or more second threat models (e.g., n-threat model 164) from the plurality of threat models 128 that includes another connection mapping (e.g., connection mapping 172-1) that indicates a connection established between organizational resources 104 and/or external resources 106.

Referring to FIG. 2B, at operation 222, processor 150 of the threat model evaluation device 102 is configured to dynamically transform the first threat model 130 and the n-threat model 164 (also interchangeably referred to as second threat model 164) to generate a sanitized version of the first threat model 146 and a sanitized version of the n-threat model 178 that remedies the first potential security vulnerability 142 associated with both the first threat model 130 and the n-threat model 164.

At operation 224, processor 150 of the threat model evaluation device 102 is configured to establish a communication session between user device 118-1 and web application 132-1. As part of establishing the communication session, a first CSRF token associated with the session is generated and stored in memory 154. Next, processor 150 of the threat model evaluation device 102 is configured to receive an access request from user device 118-1 to access the web application 132-1. The received access request includes a second CSRF token.

At operation 226, processor 150 of the threat model evaluation device 102 is configured to determine if the received second CSRF token matches the stored first CSRF token associated with the session between user device 118-1 and web application 132-1. When it is determined that the received second CSRF token matches the stored first CSRF token associated with the session, then the method takes the Yes branch and proceeds to operation 228.

At operation 228, in processor 150 of the threat model evaluation device 102 is configured to allow the access request, such that, user device 118-1 is able to access the web application 132-1.

Back at operation 226, when it is determined that the received second CSRF token does not match the stored first CSRF token associated with the session, then the method takes the No branch and proceeds to operation 230.

At operation 230, in processor 150 of the threat model evaluation device 102 is configured to deny the access request. Processor 150 determines that there is potentially a CSRF attack, and the user device 118-1 is potentially a bad actor, and thus the access request is denied.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112(f), as it exists on the date of filing hereof, unless the words "means for" or "step for" are explicitly used in the particular claim.

What is claimed is:

1. A system comprising:

a memory operable to store an artificial intelligence (AI) algorithm, a threat model database, and a static application security testing (SAST) results database, wherein the threat model database stores a plurality of threat models and wherein the SAST results database stores SAST results associated with testing a source code corresponding to each of a plurality of resources; and a processor operably coupled to the memory and configured to:

access, from the memory, a first threat model from the plurality of threat models and identify a first resource from the first threat model, wherein the first threat model at least indicates a first connection mapping associated between the first resource and a second resource of the plurality of resources;

identify a first SAST result associated with the first resource from the SAST results stored in the SAST results database, wherein the first SAST result indicates a first potential security vulnerability of the first resource while communicating with the second resource caused by unchecked data-flows of the source code of the first resource;

collect a first data set comprising the plurality of threat models stored in the memory;

collect a second data set comprising the SAST results stored in the SAST results database;

create a modified first data set by annotating a first set of threat models of the plurality of threat models, wherein the annotations indicate a missing security policy associated with each of the first set of threat models;

create a first training set comprising the first data set, the second data set, and the modified first data set;

train the AI algorithm in a first stage using the first training set;

create a second training set for a second stage of training, wherein the second training set comprises the first training set and incorrectly identified missing security policy associated with the first set of threat models after the first stage of training;

retrain the AI algorithm in a second stage using the second training set, to generate an AI model;

electronically execute the AI model using the first SAST result and the first threat model as an input, wherein the AI model is configured to identify one or more missing security policies corresponding with the first connection mapping associated between the first resource and the second resource as output, wherein the one or more missing security policies remedy the first potential security vulnerability;

in response to identifying the one or more missing security policies, identify one or more second threat models from the plurality of threat models that includes another connection mapping associated between a third resource and a fourth resource, wherein the first resource and the third resource are a first type of resource and the second resource and the fourth resource are a second type of resource, wherein the one or more second threat models include the first potential security vulnerability; and in response to identifying the one or more second threat models, dynamically transform the first threat model and the one or more second threat models to generate a sanitized version of the first threat model and the one or more second threat models that remedies the first potential security vulnerability, wherein the sanitized version of the first threat model and the one or more second threat models includes the one or more missing security policies that remedy the first potential security vulnerability.

2. The system of claim 1, wherein the first resource is a web application, the second resource is a user device, the first connection mapping associated between the first resource and the second resource is a Hypertext Transfer Protocol Secure (HTTPS) connection and wherein the first potential security vulnerability is a cross-site request forgery (CSRF) attack on the web application by the user device using the HTTPS connection.

3. The system of claim 1, wherein the first SAST result indicates a second potential security vulnerability associated with the first resource, wherein the second potential security vulnerability indicates a missing connection mapping associated between the first resource and a fifth resource of the plurality of resources.

4. The system of claim 3, wherein the AI model is configured to identify another one or more missing security policies corresponding with the missing connection mapping associated between the first resource and the fifth resource of the plurality of resources, wherein the another one or more missing security policies includes establishing a second connection mapping associated between the first resource and the fifth resource of the plurality of resources to remedy the second potential security vulnerability.

5. The system of claim 4, wherein the processor is further configured to:

in response to identifying the another one or more missing security policies, identify one or more third threat models from the plurality of threat models that include the missing connection mapping associated between the first resource and the fifth resource, wherein the one or more third threat models include the second potential security vulnerability.

6. The system of claim 5, wherein the processor is further configured to:

in response to identifying the one or more third threat models, dynamically transform the first threat model and the one or more third threat models to generate the sanitized version of the first threat model and a sanitized version of the one or more third threat models, wherein the sanitized version of the first threat model and the one or more third threat models includes the second connection mapping established between the first resource and the fifth resource of the plurality of resources to remedy the second potential security vulnerability.

7. The system of claim 6, wherein the first resource is a web application, the fifth resource is a file server device, the missing connection mapping is a missing connection between the web application and the file server device.

8. A method comprising:

accessing, from a memory, a first threat model from a plurality of threat models stored in a threat model database and identify a first resource from the first threat model, wherein the first threat model at least indicates a first connection mapping associated between the first resource and a second resource of a plurality of resources;

identifying a first SAST result associated with the first resource from a SAST results stored in a SAST results database, wherein the SAST results database stores SAST results associated with testing a source code corresponding to each of the plurality of resources and wherein the first SAST result indicates a first potential security vulnerability of the first resource while communicating with the second resource caused by unchecked data-flows of the source code of the first resource;

collecting a first data set comprising the plurality of threat models stored in the memory;

collecting a second data set comprising the SAST results stored in the SAST results database;

creating a modified first data set by annotating a first set of threat models of the plurality of threat models, wherein the annotations indicate a missing security policy associated with each of the first set of threat models;

creating a first training set comprising the first data set, the second data set, and the modified first data set;

training an AI algorithm in a first stage using the first training set;

creating a second training set for a second stage of training, wherein the second training set comprises the first training set and incorrectly identified missing security policy associated with the first set of threat models after the first stage of training;

retraining the AI algorithm in a second stage using the second training set, to generate an AI model;

electronically executing the AI model using the first SAST result and the first threat model as an input, wherein the AI model is configured to identify one or more missing security policies corresponding with the first connection mapping associated between the first resource and the second resource as output, wherein the one or more missing security policies remedy the first potential security vulnerability;

in response to identifying the one or more missing security policies, identifying one or more second threat models from the plurality of threat models that includes another connection mapping associated between a third resource and a fourth resource, wherein the first resource and the third resource are a first type of resource and the second resource and the fourth resource are a second type of resource, wherein the one or more second threat models include the first potential security vulnerability; and in response to identifying the one or more second threat models, dynamically transforming the first threat model and the one or more second threat models to generate a sanitized version of the first threat model and the one or more second threat models that remedies the first potential security vulnerability, wherein the sanitized version of the first threat model and the one or more second threat models includes the one or more missing security policies that remedy the first potential security vulnerability.

9. The method of claim 8, wherein the first resource is a web application, the second resource is a user device, the first connection mapping associated between the first resource and the second resource is a Hypertext Transfer Protocol Secure (HTTPS) connection and wherein the first potential security vulnerability is a cross-site request forgery (CSRF) attack on the web application by the user device using the HTTPS connection.

10. The method of claim 8, wherein the first SAST result indicates a second potential security vulnerability associated with the first resource, wherein the second potential security vulnerability indicates a missing connection mapping associated between the first resource and a fifth resource of the plurality of resources.

11. The method of claim 10, wherein the AI model is configured to identify another one or more missing security policies corresponding with the missing connection mapping associated between the first resource and the fifth resource of the plurality of resources, wherein the another one or more missing security policies includes establishing a second connection mapping associated between the first resource and the fifth resource of the plurality of resources to remedy the second potential security vulnerability.

12. The method of claim 11, further comprising:

in response to identifying the another one or more missing security policies, identify one or more third threat models from the plurality of threat models that include the missing connection mapping associated between the first resource and the fifth resource, wherein the one or more third threat models include the second potential security vulnerability.

13. The method of claim 12, further comprising:

in response to identifying the one or more third threat models, dynamically transform the first threat model and the one or more third threat models to generate the sanitized version of the first threat model and a sanitized version of the one or more third threat models, wherein the sanitized version of the first threat model and the one or more third threat models includes the second connection mapping established between the first resource and the fifth resource of the plurality of resources to remedy the second potential security vulnerability.

14. The method of claim 13, wherein the first resource is a web application, the fifth resource is a file server device, the missing connection mapping is a missing connection between the web application and the file server device.

15. A non-transitory computer-readable medium storing instructions that, when executed by a processor, cause the processor to:

access, from a memory, a first threat model from a plurality of threat models stored in a threat model database and identify a first resource from the first threat model, wherein the first threat model at least indicates a first connection mapping associated between the first resource and a second resource of a plurality of resources;

identify a first SAST result associated with the first resource from a SAST results stored in a SAST results database, wherein the SAST results database stores SAST results associated with testing a source code corresponding to each of the plurality of resources and wherein the first SAST result indicates a first potential security vulnerability of the first resource while communicating with the second resource caused by unchecked data-flows of the source code of the first resource;

collect a first data set comprising the plurality of threat models stored in the memory;

collect a second data set comprising the SAST results stored in the SAST results database;

create a modified first data set by annotating a first set of threat models of the plurality of threat models, wherein the annotations indicate a missing security policy associated with each of the first set of threat models;

create a first training set comprising the first data set, the second data set, and the modified first data set;

train an AI algorithm in a first stage using the first training set;

create a second training set for a second stage of training, wherein the second training set comprises the first training set and incorrectly identified missing security policy associated with the first set of threat models after the first stage of training;

retrain the AI algorithm in a second stage using the second training set, to generate an AI model;

electronically execute the AI model using the first SAST result and the first threat model as an input, wherein the AI model is configured to identify one or more missing security policies corresponding with the first connection mapping associated between the first resource and the second resource as output, wherein the one or more missing security policies remedy the first potential security vulnerability;

in response to identifying the one or more missing security policies, identify one or more second threat models from the plurality of threat models that includes another connection mapping associated between a third resource and a fourth resource, wherein the first resource and the third resource are a first type of resource and the second resource and the fourth resource are a second type of resource, wherein the one or more second threat models include the first potential security vulnerability; and in response to identifying the one or more second threat models, dynamically transform the first threat model and the one or more second threat models to generate a sanitized version of the first threat model and the one or more second threat models that remedies the first potential security vulnerability, wherein the sanitized version of the first threat model and the one or more second threat models includes the one or more missing security policies that remedy the first potential security vulnerability.

16. The non-transitory computer-readable medium of claim 15, wherein the first resource is a web application, the second resource is a user device, the first connection mapping associated between the first resource and the second resource is a Hypertext Transfer Protocol Secure (HTTPS) connection and wherein the first potential security vulnerability is a cross-site request forgery (CSRF) attack on the web application by the user device using the HTTPS connection.

17. The non-transitory computer-readable medium of claim 15, wherein the first SAST result indicates a second potential security vulnerability associated with the first resource, wherein the second potential security vulnerability indicates a missing connection mapping associated between the first resource and a fifth resource of the plurality of resources.

18. The non-transitory computer-readable medium of claim 17, wherein the AI model is configured to identify another one or more missing security policies corresponding with the missing connection mapping associated between the first resource and the fifth resource of the plurality of resources, wherein the another one or more missing security policies includes establishing a second connection mapping associated between the first resource and the fifth resource of the plurality of resources to remedy the second potential security vulnerability.

19. The non-transitory computer-readable medium of claim 18, further comprising:

in response to identifying the another one or more missing security policies, identify one or more third threat models from the plurality of threat models that include the missing connection mapping associated between the first resource and the fifth resource, wherein the one or more third threat models include the second potential security vulnerability.

20. The non-transitory computer-readable medium of claim 19, further comprising:

in response to identifying the one or more third threat models, dynamically transform the first threat model and the one or more third threat models to generate the sanitized version of the first threat model and a sanitized version of the one or more third threat models, wherein the sanitized version of the first threat model and the one or more third threat models includes the second connection mapping established between the first resource and the fifth resource of the plurality of resources to remedy the second potential security vulnerability.

* * * * *